(12) United States Patent
Baer et al.

(10) Patent No.: US 10,608,479 B2
(45) Date of Patent: Mar. 31, 2020

(54) UNDERWATER POWER AND DATA TRANSFER SYSTEM

(71) Applicant: Battelle Memorial Institute, Columbus, OH (US)

(72) Inventors: Christopher M. Baer, Columbus, OH (US); Richard P. Granger, Columbus, OH (US); John J. Labosky, Worthington, OH (US); David E. Pyle, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 153 days.

(21) Appl. No.: 15/545,466

(22) PCT Filed: Jan. 22, 2016

(86) PCT No.: PCT/US2016/014511
§ 371 (c)(1),
(2) Date: Jul. 21, 2017

(87) PCT Pub. No.: WO2016/153589
PCT Pub. Date: Sep. 29, 2016

(65) Prior Publication Data
US 2018/0006506 A1    Jan. 4, 2018

Related U.S. Application Data

(60) Provisional application No. 62/107,347, filed on Jan. 23, 2015.

(51) Int. Cl.
*H02J 7/00* (2006.01)
*H02J 7/14* (2006.01)
(Continued)

(52) U.S. Cl.
CPC .............. *H02J 50/80* (2016.02); *H02J 7/025* (2013.01); *H02J 50/12* (2016.02); *H02J 50/90* (2016.02)

(58) Field of Classification Search
USPC ................ 320/101, 107, 109, 132, 134, 136
See application file for complete search history.

(56) References Cited

U.S. PATENT DOCUMENTS

2011/0204845 A1    8/2011  Paparo et al.
2011/0309687 A1   12/2011  Bohori et al.
(Continued)

FOREIGN PATENT DOCUMENTS

WO    2014119085 A1    8/2014

OTHER PUBLICATIONS

International Search Report and Written Opinion in International Application No. PCT/US2016/014511, dated Oct. 7, 2016 (10 pages).

*Primary Examiner* — Alexis B Pacheco
(74) *Attorney, Agent, or Firm* — Benesch, Friedlander, Coplan & Aronoff LLP

(57) ABSTRACT

According to the embodiments provided herein, power and data transfer system may include a primary inductive, a secondary inductive coupler, a power source, and a controller. The primary inductive coupler may forms a flat front face. The primary inductive coupler may include a primary winding wound around a primary core. The primary core may be adjacent to the flat front face. The secondary inductive coupler may be separated from the flat front face of the primary inductive coupler by a fluid. The secondary inductive coupler may include a secondary winding. The power source may generate a current in the primary winding of the primary inductive coupler and a magnetic field in the secondary winding of the secondary inductive coupler. The controller may execute machine readable instructions to
(Continued)

receive charging data via a feedback loop and adjust the current based upon the charging data.

19 Claims, 14 Drawing Sheets

(51) Int. Cl.
    *H02J 50/80* (2016.01)
    *H02J 7/02* (2016.01)
    *H02J 50/12* (2016.01)
    *H02J 50/90* (2016.01)

(56) References Cited

U.S. PATENT DOCUMENTS

| | | | |
|---|---|---|---|
| 2012/0032632 A1 | 2/2012 | Soar | |
| 2012/0043930 A1 | 2/2012 | Scudiere | |
| 2013/0170258 A1* | 7/2013 | Calvin | H01F 38/14 363/64 |
| 2013/0334892 A1* | 12/2013 | Hall | H01F 38/14 307/104 |
| 2014/0175898 A1* | 6/2014 | Kurs | B60L 53/51 307/104 |
| 2014/0232200 A1 | 8/2014 | Maekawa | |
| 2014/0339913 A1* | 11/2014 | Tsuji | H02J 5/005 307/104 |
| 2015/0015194 A1* | 1/2015 | Leabman | H04B 1/04 320/108 |
| 2015/0115871 A1* | 4/2015 | Feril | H04R 1/105 320/103 |
| 2015/0255994 A1* | 9/2015 | Kesler | H02J 5/005 307/10.1 |
| 2016/0094051 A1* | 3/2016 | Soar | H04B 5/0031 307/9.1 |

* cited by examiner

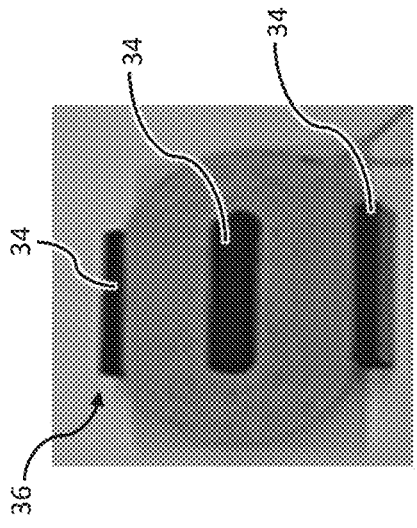
FIG. 4A
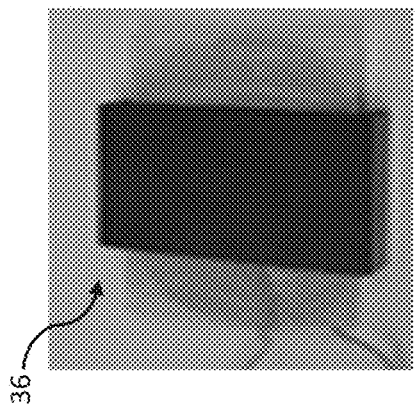
FIG. 4B
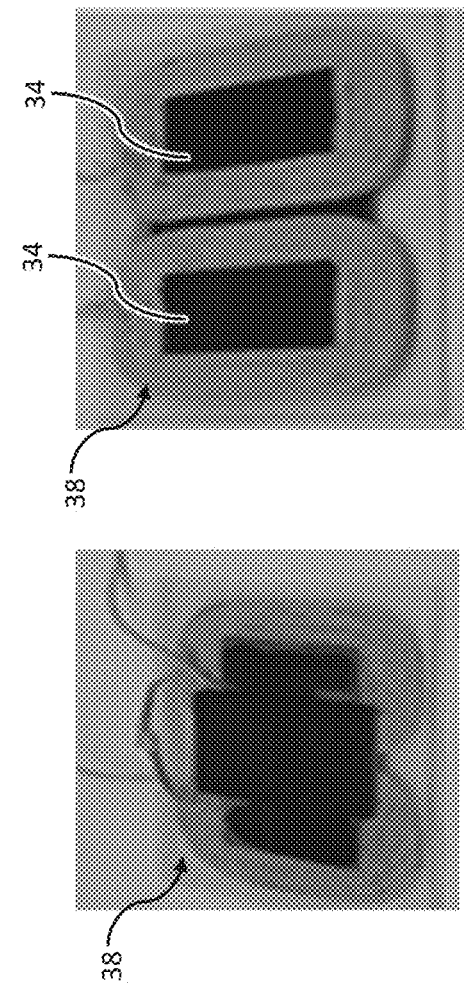
FIG. 5A
FIG. 5B
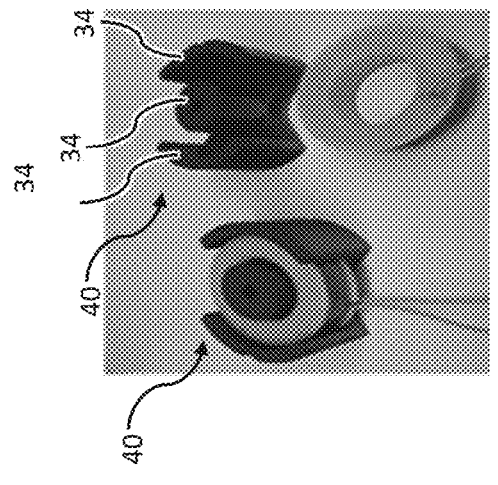
FIG. 6 ial Patent Application No. 62/107,347, filed on Jan. 23, 2015, which is incorporated by reference herein in its entirety.

UNDERWATER POWER AND DATA TRANSFER SYSTEM

CROSS-REFERENCE TO RELATED APPLICATIONS

This application claims priority from U.S. Provisional Patent Application No. 62/107,347, filed on Jan. 23, 2015, which is incorporated by reference herein in its entirety.

TECHNICAL FIELD

Autonomous systems can be used to increase battlespace awareness and project the sensor reach of the host platform into previously denied areas.

BACKGROUND ART

Persistent ocean surveillance is a strategic need that is being actively pursued by the U.S. Navy. Hosting Unmanned Underwater Vehicles ("UUVs") on U.S. Navy submarines in order to support long-term, independent Intelligence. Surveillance, Reconnaissance ("ISR"), Anti-Submarine Warfare ("ASW") and Mine Counter-Measures ("MCM") missions is viewed as an essential component of providing this capability. In this capacity. UUVs with the capability of extended operations are envisioned to support Special Forces operations in locations where their host platform is unable or unwilling to operate, to extend the sensors of the host platform into dangerous waters, or to collect information for the platform while that platform is being used for more appropriate applications. To realize this vision, the Navy needs a reliable means to remotely launch and recover multiple UUVs, and provide for sustained UUV operations via energy replenishment and data transfer.

While UUVs are currently being used in the aforementioned roles, current systems supporting UUV deployment are insufficient for long-term use of a UUV in underwater operations.

The present application is directed to novel charging and data transfer systems and methods for use in UUV applications.

SUMMARY OF INVENTION

In one embodiment, an underwater power and data transfer system is provided, the underwater power and data transfer system comprising: an underwater charging system operable to charge an underwater data collection device in an underwater environment; and an underwater data transfer system operable to transmit and/or receive data from an underwater data collection device in an underwater environment.

In another embodiment, an undersea power and data transfer system for charging and transferring and/or receiving data from a UUV is provided, the undersea power and data transfer system comprising: a docking station, the docking station operable to dock the UUV, the docking station further comprising an underwater wireless charging system operable to wirelessly charge the UUV, and an underwater wireless data transfer system operable to wirelessly transfer data from the docking station to the UUV and wirelessly transfer data from the UUV to the docking station.

In another embodiment, a method for providing power to a UUV and for transferring data to, and receiving data from and the UUV is provided, the method comprising the steps of: correctly aligning and positioning the UUV within a docking station such that a primary inductive coupler on the docking station is correctly lined and spaced from a secondary inductive coupler on the UUV such that the primary inductive coupler is inductively coupled to the secondary inductive coupler; using a power source operatively connected to the docking station to generate a current in a primary winding of the primary inductive coupler such that the current generates a magnetic flux in a primary core of the primary inductive coupler to generate a magnetic field in a secondary winding in the secondary inductive coupler; generating a voltage from the magnetic field in the secondary inductive coupler; charging a battery within the UUV with the voltage created in the secondary inductive coupler; sensing a voltage in the secondary inductive coupler to generate a voltage data, and sensing a current in the secondary inductive coupler to generate a current data; transmitting the voltage data and the current data from the secondary inductive coupler to a control system in the primary inductive coupler; varying the current in the primary coil based on the voltage data and the current data to control the charging of the battery within the UUV; and wirelessly transmitting data collected from the UUV via an antenna on the UUV to an antenna on the docking station, and further transmitting data from the docking station to a manned underwater vehicle.

In another embodiment, a power and data transfer system may include a primary inductive, a secondary inductive coupler, a power source, and a controller. The primary inductive coupler may forms a flat front face. The primary inductive coupler may include a primary winding wound around a primary core. The primary core may be adjacent to the flat front face. The secondary inductive coupler may be separated from the flat front face of the primary inductive coupler by a fluid. The secondary inductive coupler may include a secondary winding. The power source may be operatively connected to the primary winding of the primary inductive coupler. The power source may generate a current in the primary winding of the primary inductive coupler and a magnetic field in the secondary winding of the secondary inductive coupler. The controller may be operatively connected to the power source. The controller may execute machine readable instructions to receive charging data via a feedback loop. The charging data may be indicative of the secondary inductive coupler. The current generated by the power source may be adjusted based upon the charging data.

In another embodiment, an underwater power and data transfer system may include a primary inductive coupler, a secondary inductive coupler, primary resonant components, secondary resonant components, and a controller. The primary inductive coupler may form a front face. The primary inductive coupler may include a primary winding wound around a primary core. The primary core may be adjacent to the front face. The secondary inductive coupler may be separated from the front face of the primary inductive coupler by water. The secondary inductive coupler may include a secondary winding wound around a secondary core. The primary resonant components may be operatively connected to the primary winding of the primary inductive coupler. The primary resonant components may output a current to the primary winding of the primary inductive coupler such that a magnetic field is generated in the secondary winding of the secondary inductive coupler. The secondary resonant components may be operatively connected to the secondary winding of the secondary inductive coupler and a load. The secondary resonant components may be tuned to the primary resonant components. The controller may be operatively connected to the power source. The controller may execute machine readable instructions to receive charging data via a feedback loop. The charging data may be indicative of an electrical signal of the load. The current provided by the primary resonant components may be adjusted based upon the charging data.

According to any of the systems and methods provided herein, a controller may be configured to read analog signals.

Any of the systems or methods provided herein may include a docking station operable to dock an underwater data collection device. An underwater charging system and underwater data transfer system may be operatively connected to the docking station.

According to any of the systems and methods provided may include an underwater charging system. The underwater charging system may include a wireless charging system operable to wirelessly charge an underwater data collection device.

Any of the systems and methods provided herein may include a wireless charging system. The wireless charging system may include an inductive charging system. The inductive charging system may include a primary inductive coupler operable to inductively couple to a secondary inductive coupler on an underwater data collection device. The primary inductive coupler may transfer electrical power from a power source by way of inductive coupling to the secondary inductive coupler on the underwater data collection device to provide electrical power to the underwater data collection device.

Any of the systems and methods provided herein may include an underwater data transfer system. The underwater data transfer system may include a wireless data transfer system operable to wirelessly transfer and/or receive data from an underwater data collection device. Alternatively or additionally, the wireless data transfer system may include at least one of: an internal antenna, a low-profile antenna, and a patch antenna. The at least one of the internal antenna, the low-profile antenna, and the patch antenna may be operable to transmit and/or receive data from a corresponding wireless data transfer system on the underwater data collection device. Alternatively or additionally, the wireless data transfer system may be operable to wirelessly transfer data using an IEEE 802.11 protocol.

Any of the systems and methods provided herein may include an underwater charging system and an underwater data transfer system. The underwater charging system and the underwater data transfer system may be potted with a potting compound. The potting compound may be operable to prevent moisture from contacting the underwater charging system and the underwater data transfer system; withstand a water pressure generated in the underwater environment to protect the underwater charging system and the underwater data transfer system from a destructive pressure; conduct and distribute a heat dissipated from the underwater charging system and the underwater data transfer system.

Any of the systems and methods provided herein may include a docking station. The docking station may be operatively connected to a launch and recovery module. The launch and recovery module may be operable to deploy the docking station from within a manned underwater vehicle into an underwater environment, and retract the docking station from the underwater environment into the manned underwater vehicle.

Any of the systems and methods provided herein may include a underwater wireless charging system. The underwater wireless charging system may include an inductive charging system. The inductive charging system may include a primary inductive coupler. The primary inductive coupler may be operatively connected to a power source. The primary inductive coupler may be operable to interface with and inductively couple to a secondary inductive coupler on an UUV. A primary winding in the primary inductive coupler may be operable to vary a current from the power source such that a magnetic flux is created in a core of the primary inductive coupler. A varying magnetic field may be created in a secondary winding in the secondary inductive coupler. The varying magnetic field may induce a voltage in the secondary inductive coupler operable to charge a battery within the UUV. Alternatively or additionally, the primary inductive coupler and the secondary inductive coupler may form a flat planar interface. Alternatively or additionally, the underwater wireless charging system may include a wireless data coupler. The wireless data coupler may be operable to: sense a voltage in the secondary inductive coupler and generate a voltage data for the voltage, sense a current in the secondary inductive coupler and generate a current data for the current; wirelessly transmit each of the voltage data and the current data from the secondary inductive coupler to a control system controlling the primary inductive coupler. The control system may be operable to control: the current and the magnetic flux created therefrom in the primary inductive coupler: the voltage in secondary inductive coupler; and the charging of the battery within the UUV. Alternatively or additionally, any of the systems and methods provided herein may include a docking station. The docking station may include a mating detector operable to sense a spacing and alignment of the secondary inductive coupler on the UUV relative to the primary inductive coupler on the docking station. The spacing and alignment may be determined adequate to permit a transfer of power between the primary inductive coupler and the secondary inductive coupler, and to permit a transfer of voltage data and current data from the secondary inductive coupler to a control system on the primary inductive coupler. Alternatively or additionally, any of the systems and methods provided herein may include a spacing an alignment control system operable to vary a linear position of the primary inductive coupler on one of an x-axis, a y-axis, or a z-axis, and vary a rotational position of the secondary inductive coupler on the UUV to provide an adequate spacing and alignment between the primary inductive coupler and the secondary inductive coupler.

Any of the systems and methods provided herein may include an underwater wireless data transfer system. The underwater wireless data transfer system may include an antenna that includes at least one of: an internal antenna, a low-profile antenna, and a patch antenna. The antenna may be operable to transmit data to a corresponding antenna on the UUV, and receive data from the corresponding antenna on the UUV.

Any of the systems and methods provided herein may include an underwater wireless data transfer system. The underwater wireless data transfer system may be operable to wirelessly transfer and receive data using an IEEE 802.11ac protocol.

Any of the systems and methods provided herein may include an underwater wireless charging system and an underwater wireless data transfer system. The underwater wireless charging system and the underwater wireless data transfer system may be potted with an epoxy potting compound. The epoxy potting compound may be operable to: waterproof the underwater wireless charging system and the underwater wireless data transfer system; withstand and protect the underwater wireless charging system and the underwater wireless data transfer system from a water pressure in an underwater environment; and conduct and distribute a heat dissipated from the underwater wireless charging system and the underwater wireless data transfer system.

Any of the systems and methods provided herein may include a launch and recovery module. The launch and recovery module further may include a secondary communication system for transferring data to a manned underwater vehicle, and receiving data from the manned underwater vehicle.

Any of the systems and methods provided herein may include primary resonant components operatively connected to a power source and a primary inductive coupler. The primary resonant components may be configured to drive the primary inductive coupler. Alternatively or additionally, the primary resonant components may include an LCC (inductor-capacitor-capacitor) resonant circuit topology. Alternatively or additionally, the primary resonant components may include capacitors collocated with the primary core.

Any of the systems and methods provided herein may include a primary antenna operatively connected to a controller. A feedback loop may be provided by the primary antenna. Alternatively or additionally, the primary antenna may be configured to communicate according to an 802.11 protocol. Alternatively or additionally, the primary antenna may be a patch antenna array.

Any of the systems and methods provided herein may include a feedback loop. The feedback loop may be provided via a primary inductive coupler and a secondary inductive coupler.

Any of the systems and methods provided herein may include an electrical sensor operatively connected to a load charged by a secondary inductive coupler. The electrical sensor may detect charging data.

Any of the systems and methods provided herein may include a mating detection sensor operatively connected to a controller. The mating detection sensor may detect that a primary inductive coupler and a secondary inductive coupler are within an operating range of one another.

Any of the systems and methods provided herein may include a primary winding formed as a spiral coil on a printed circuit board.

Any of the systems and methods provided herein may include a primary winding formed from multiple layers of thin foil.

Any of the systems and methods provided herein may include a primary core having at least one flat coupling face. Alternatively or additionally, the primary core may be formed into an E core topology. Alternatively or additionally, the at least one flat coupling face of the primary core may be parallel to a flat front face of a primary inductive coupler. Alternatively or additionally, the at least one flat coupling face of the primary core may be exposed directly to the front face of the primary inductive coupler without any intervening conductive elements.

Any of the systems and methods provided herein may include a primary inductive coupler and a secondary inductive coupler that are symmetric.

Any of the systems and methods provided herein may include a primary inductive coupler potted in epoxy, such that the primary inductive coupler is waterproof and pressure tolerant.

Any of the systems and methods provided herein may include a primary inductive coupler provided on a docking station having a primary component, and a secondary inductive coupler provided on an Unmanned Underwater Vehicle.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 4A, 4B, 5A, 5B, and 6 schematically depict core topologies according to one or more embodiments shown and described herein;

DESCRIPTION OF EMBODIMENTS

The embodiments disclosed herein depict and describe power and data transfer systems and methods.

Figure 1:
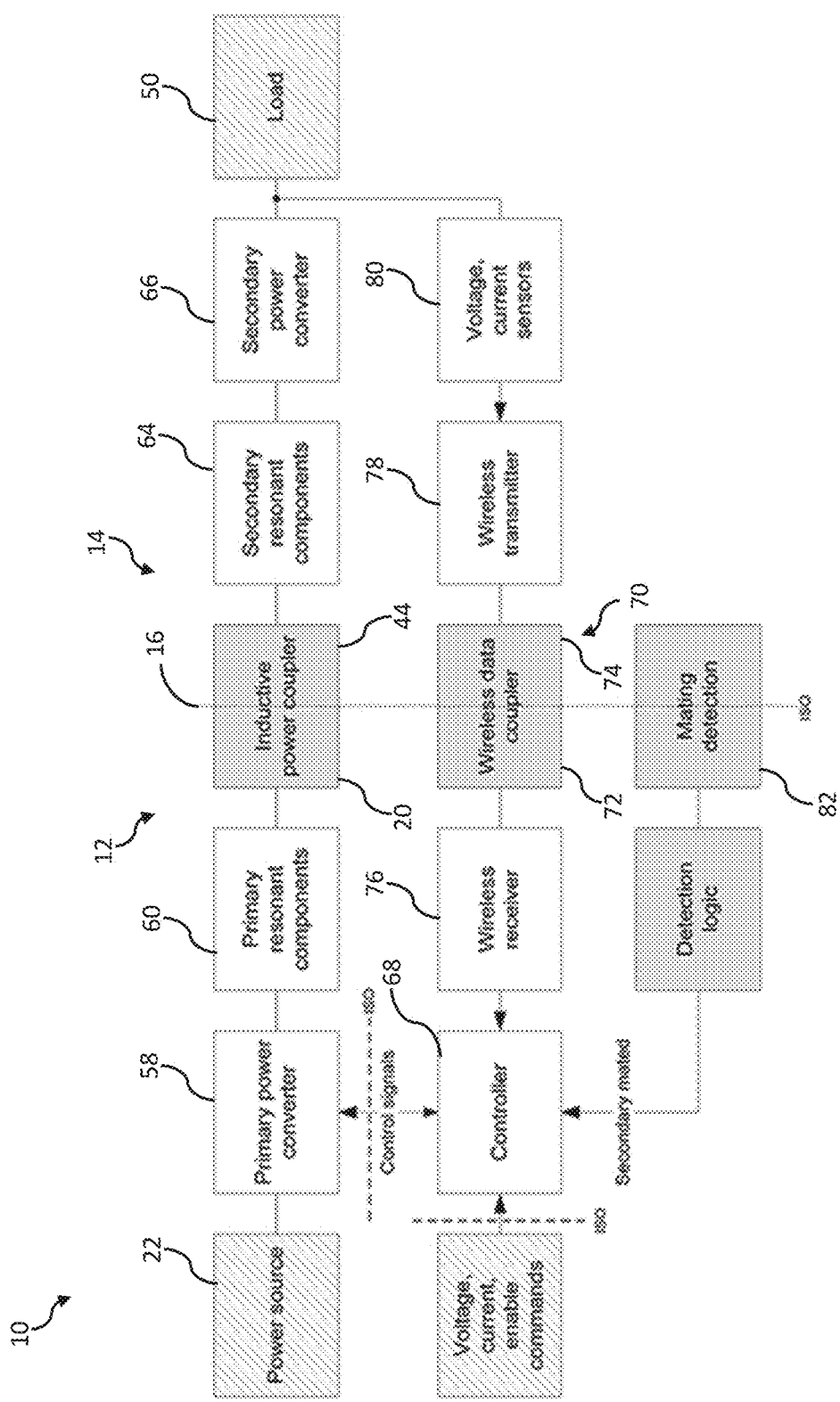
FIG. 1 schematically depicts a power and data transfer system according to one or more embodiments shown and described herein.

Referring now to FIG. 1, a power and data transfer system 10 is schematically depicted. The system 10 may be configured to communicate power and data between a primary component 12 and a secondary component 14 that are physically separated. It is noted that the physical separation is generally demarcated in FIG. 1 by the dashed line 16. Accordingly, the system 10 may be used to communicate power and data wirelessly between the primary component 12 and the secondary component 14 via a fluid interposed between the primary component 12 and the secondary component 14. For the purpose defining and describing the present disclosure, it is noted that the term "fluid" as used herein may mean a substance, such as a liquid or a gas, that is capable of flowing and that changes its shape when acted upon by a force tending to change its shape. Exemplary fluids may comprise, but are not limited to, water, air, or the like.

Figure 2:
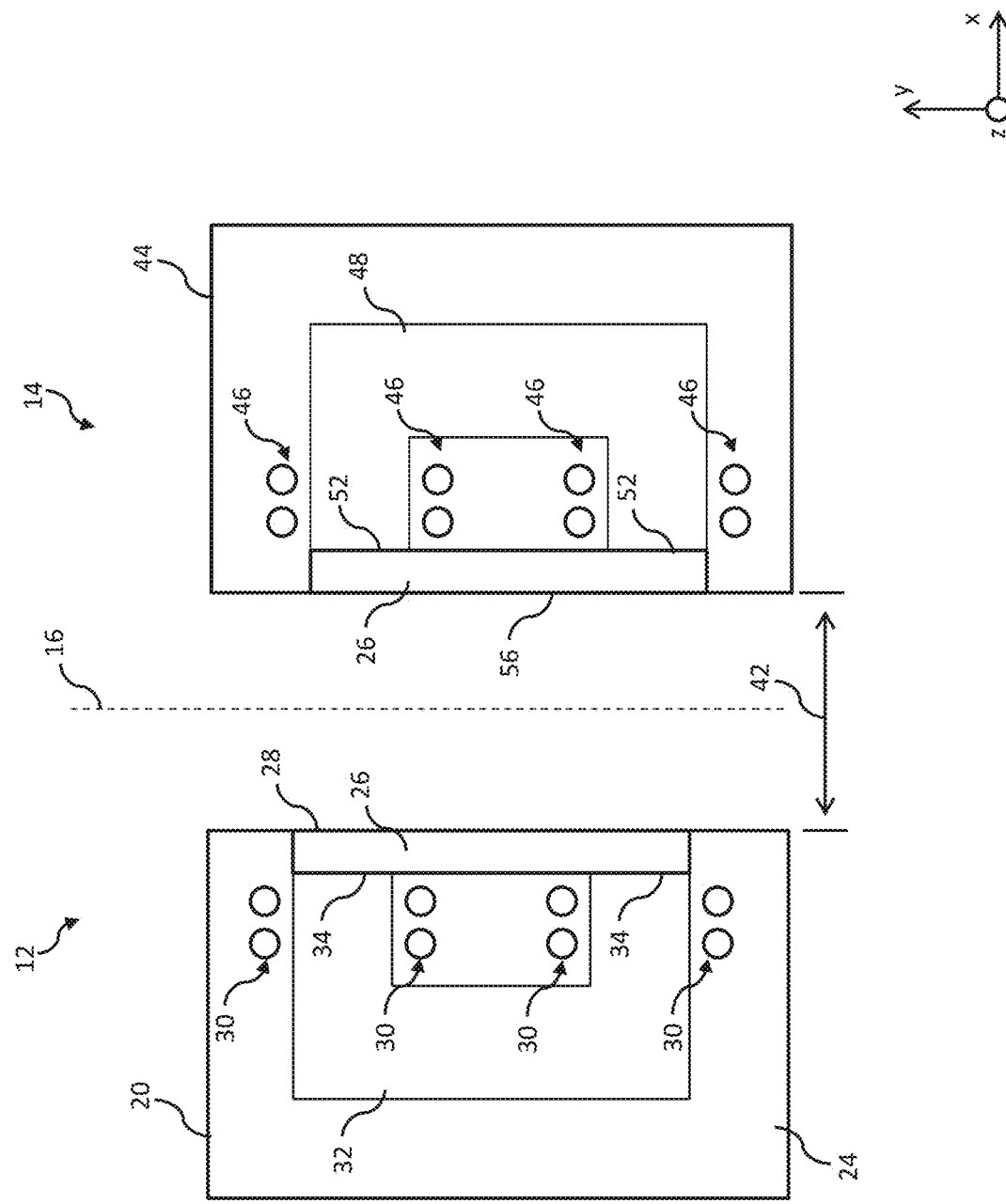
FIG. 2 schematically depicts a primary inductive coupler and a secondary inductive coupler according to one or more embodiments shown and described herein.

Referring collectively to FIGS. 1 and 2, the primary component 12 of the system 10 may comprise a primary inductive coupler 20 for transferring power from the primary component 12 to the secondary component 14. In some embodiments, the primary inductive coupler 20 may be operatively connected to a power source 22 such as, for example, a battery, a generator, power supply, and the like. As used herein, the phrase "operatively connected" may mean that the identified components are connected in a way to perform a designated function. Accordingly, the operatively connected electrical or magnetic components may be capable of exchanging electrical signals, magnetic signals, or a combination thereof directly or via one or more intervening components. Thus, operatively connected components may exchange signals with one another such as, for example, electrical signals via conductive medium, electromagnetic signals via air, magnetic signals via fluid, and the like. Furthermore, the term "signal," as used herein, can mean a waveform comprising one or more analog or digital constituents such as, for example, DC, AC, sinusoidal-wave, triangular-wave, square-wave, and the like, capable of traveling through a medium.

The primary inductive coupler 20 may comprise a housing 24 configured to protect and arrange the components of the primary inductive coupler 20. In some embodiments, the housing 24 may be formed from a substantially rigid and nonconductive material. Suitable materials include plastics such as, but not limited to, Acrylonitrile Butadiene Styrene (ABS). According to the embodiments described herein, the primary inductive coupler 20 may be provided as a solid epoxy-potted assembly to create a waterproof and pressure tolerant device. For example, the housing 24 can be formed as shell that provides adequate spacing between each of electrical components and between the electrical components and the housing 24. Additionally, the electrical components may be arranged according to best commercial practices for grounding, shielding, filtering and isolation of EMI sensitive components. For example, optical isolation may be used to prevent common mode coupling between circuits.

Accordingly, during manufacture, epoxy 26 can be provided with substantially unrestricted flow into empty spaces in the assembly to pot the components. Suitable epoxy 26 may comprise epoxy resin such as, for example, the West Systems® epoxy available from Gougeon Brothers, Inc. of Bay City, Mich., U.S.A. Generally, the epoxy 26 may be selected such that the glass transition temperature of the epoxy 26 is greater than the operating temperature of the primary inductive coupler 20, the ambient environment, or both. Optionally, the epoxy 26 may be mixed with additives to improve thermal conductivity. Alternately or additionally, the size of the primary inductive coupler 20 may be increased to reduce power density and mitigate glass transition temperature concerns.

The primary inductive coupler 20 may comprise a front face 28 configured to promote inductive coupling. In some embodiments, the front face 28 may be flat. Specifically, the front face 28 may form a substantially planar area. It is noted that, while the front face 28 is depicted in FIG. 2 as being formed from the epoxy 26, the front face 28 may be formed from any non-conductive material.

Figure 3A:
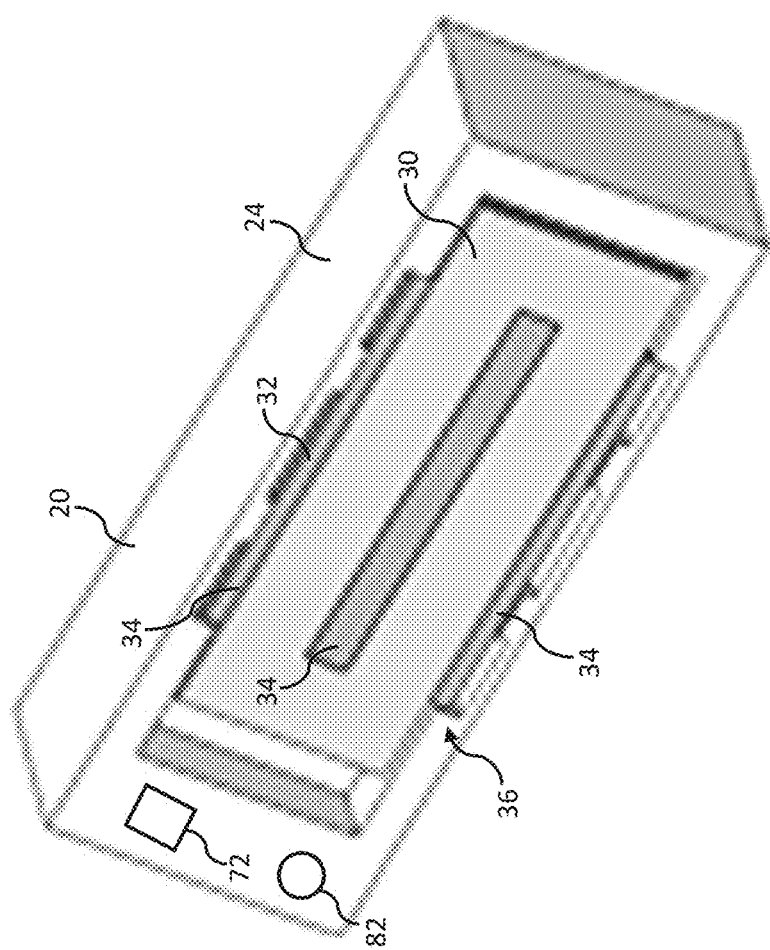
FIG. 3A schematically depicts a front isometric view of a primary inductive coupler with the front face omitted according to one or more embodiments shown and described herein.
Figure 3B:
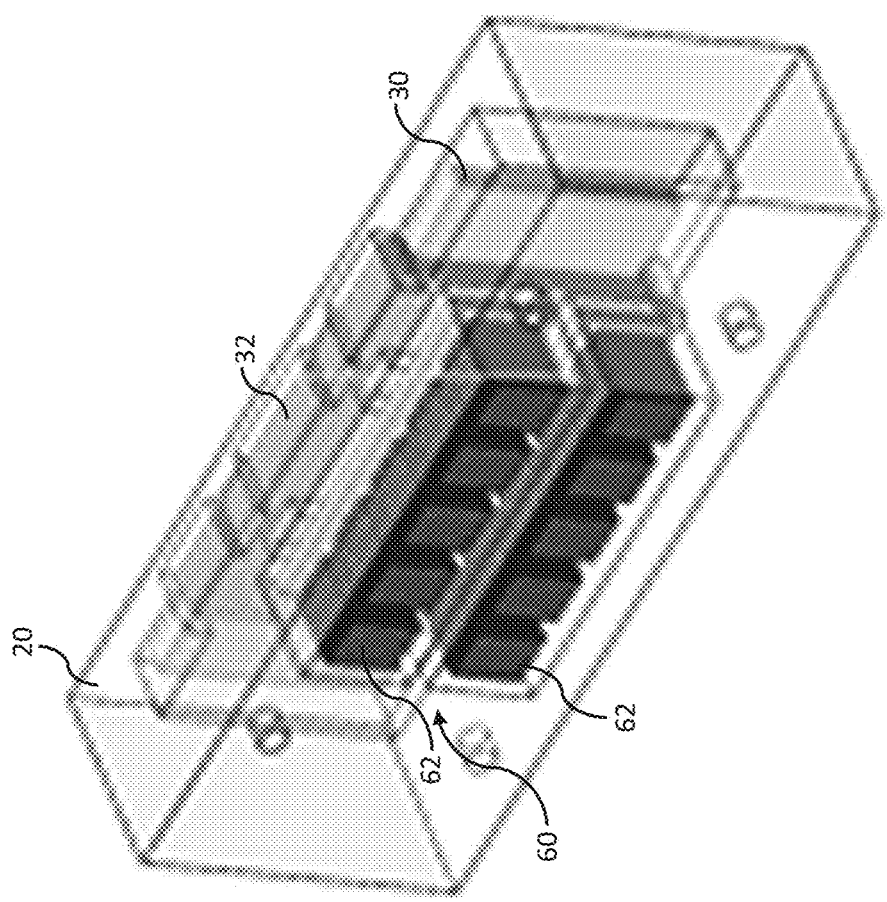
FIG. 3B schematically depicts a back isometric view of the primary inductive coupler of FIG. 3A according to one or more embodiments shown and described herein.
Figure 7A:
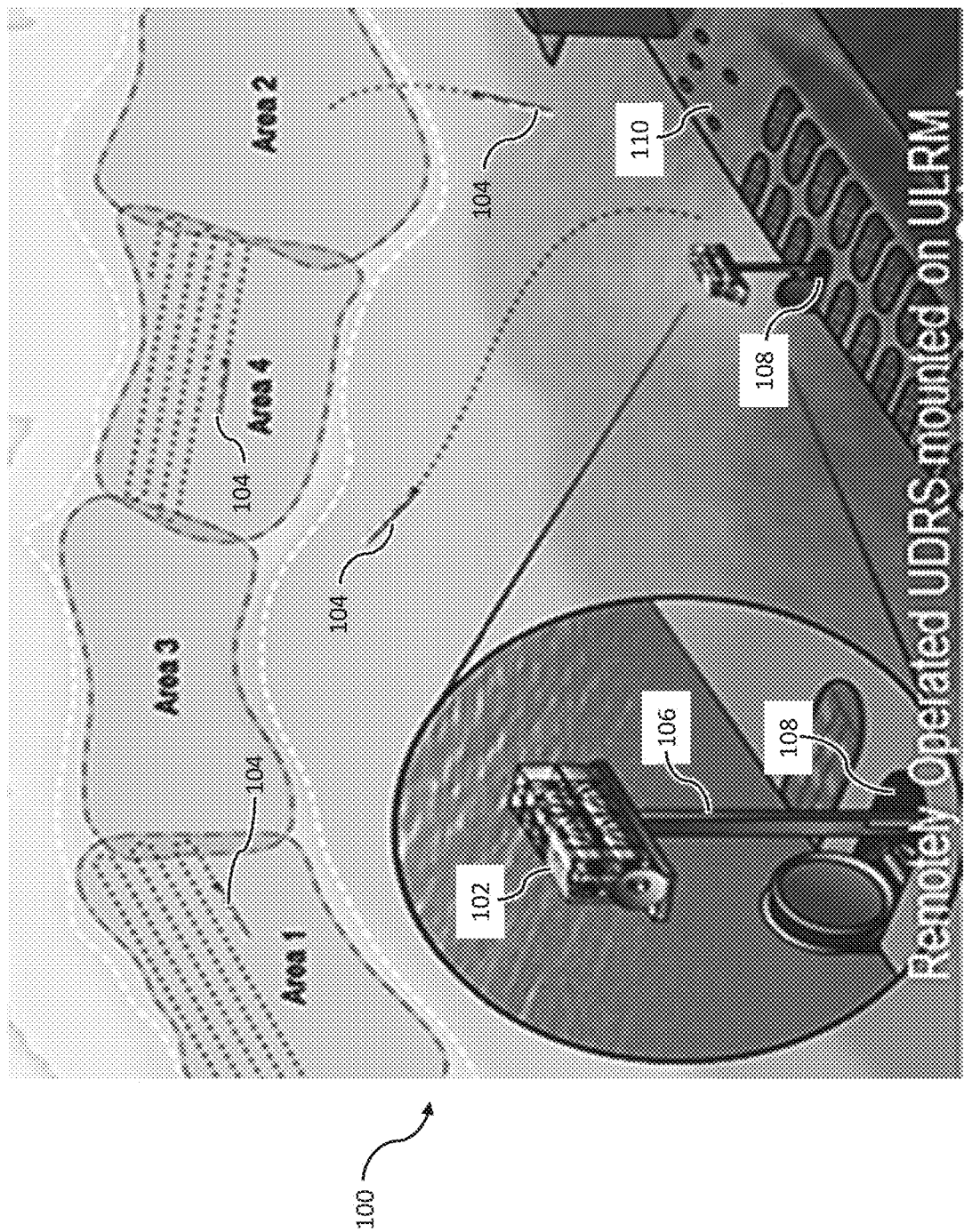
FIGS. 7A, 7B, and 7C schematically depict an example launch and recovery system, an example docking station, an example UUV, and an example interface between a UUV and a docking station according to one or more embodiments shown and described herein.
Figure 7C:
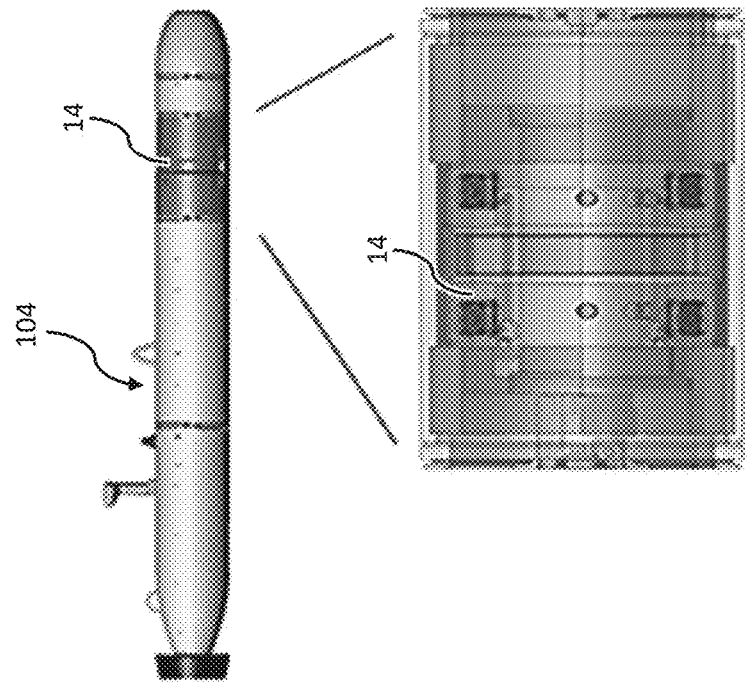
Figure 7B:
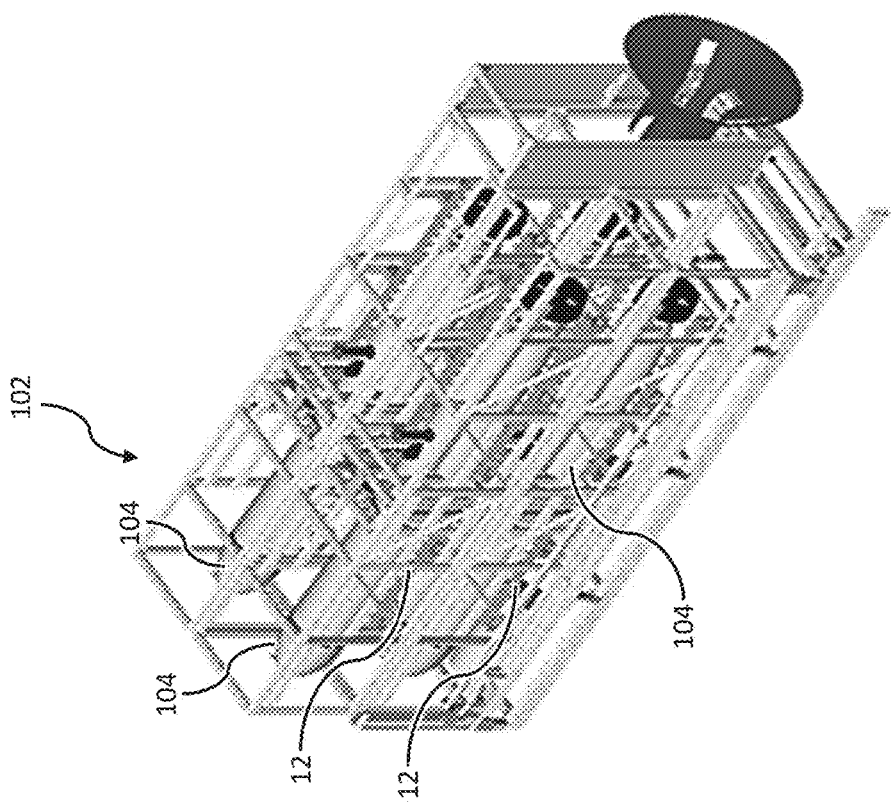

Referring collectively to FIGS. 2, 3A, and 3B, the primary inductive coupler 20 may comprise a primary winding 30 wound around a primary core 32. The primary winding 30 may comprise a conductive material. Accordingly, an electrical current may be induced to flow via the primary winding 30. In some embodiments, the primary winding 30 may be formed as a spiral coil on a printed circuit board. Alternatively or additionally, the primary winding 30 may be formed from multiple layers of thin foil, which may be configured to reduce any proximity effects of the winding. In some embodiments, the primary core 32 may be formed from a ferromagnetic material or ferrimagnetic material such as, for example, iron or ferrite. Accordingly, induced electrical currents in the primary winding 30 may cause a magnetic field to be generated in the primary core 32. Likewise, time varying magnetic fields induced in the primary core 32 may cause a current to be generated in the primary winding 30.

Referring collectively to FIGS. 3A. 3B, 4A, 4B, 5A, 5B, and 6, the primary core 32 may be formed into various topologies. In some embodiments, the primary core 32 may comprise a substantially planar topology, i.e., the primary core 32 may comprise at least one flat coupling face 34 that forms a substantially planar area. For example, the primary core 32 may be formed into an E core topology 36 (FIGS. 3A, 3B, 4A, and 4B), an I core topology 38 (FIGS. 5A, and 5B), a PM core topology 40 (FIG. 6), and any other topology defining at least one flat coupling face 34. The at least one flat coupling face 34 may be configured to communicate a magnetic field from the primary component 12 and across the gap 42 to the secondary component 14. The planar topology may yield improved, repeatable alignment and power transfer performance and may increase ease of manufacture.

Referring again to FIGS. 1 and 2, the secondary component 14 of the system 10 may comprise a secondary inductive coupler 44 for receiving power from the primary component 12. In some embodiments, the secondary inductive coupler 44 and the primary component 12 may be configured to operate over a frequency range of about 150 kHz to about 2000 kHz. The secondary inductive coupler 44 may comprise a secondary winding 46 wound around a secondary core 48. The secondary winding 46 may comprise any of the components described herein with respect to the primary winding 30. In some embodiments, the secondary inductive coupler 44 may be operatively connected to a load 50 such as, for example, a battery. The primary inductive coupler 20 and the secondary inductive coupler 44 may be configured to substantially match the voltage output from the power source 22 to voltage demand of the load 50. Accordingly, the turn ratio between the primary winding 30 and the secondary winding 46 may be configured to step up voltage, step down voltage, or maintain voltage.

Alternatively or additionally, secondary core 48 may comprise any of the components described herein with respect to the primary core 32. Accordingly, the secondary core 48 may comprise at least one flat coupling face 52. It is noted that, while FIG. 2 depicts the primary inductive coupler 20 and the secondary inductive coupler 44 as being substantially symmetric, i.e., having the same core topology, the secondary inductive coupler 44 may have any topology suitable to align one of the at least one flat coupling face 52 of the secondary core 48 with one of the at least one flat coupling face 34 of the primary core 32.

Like the primary inductive coupler 20, the secondary inductive coupler 44 may be formed within a housing 54 that is potted with the epoxy 26. Accordingly, the secondary inductive coupler 44 may be formed as a waterproof and pressure tolerant device. The secondary inductive coupler 44 may comprise a front face 56 configured to promote inductive coupling with the primary inductive coupler 20. Specifically, the front face 56 may be configured to align the at least one flat coupling face 52 of the secondary core 48 with the at least one flat coupling face 34 of the primary core 32. In some embodiments, the front face 56 may be flat. Accordingly, the front face 28 of the primary inductive coupler 20 may be opposed to the front face 56 of the secondary inductive coupler 44 such that the front face 28 of the primary inductive coupler 20 and the front face 56 of the secondary inductive coupler 44 bound the gap 42.

Referring still to FIGS. 1 and 2, in some embodiments, the front face 28 of the primary inductive coupler 20 may be substantially parallel to the at least one flat coupling face 34 of the primary core 32. Alternatively or additionally, the front face 56 of the secondary inductive coupler 44 may be substantially parallel to the at least one flat coupling face 52 of the secondary core 48. Accordingly, the at least one flat coupling face 34 of the primary core 32 may be substantially parallel to the at least one flat coupling face 52 of the secondary core 48, when the front face 28 of the primary inductive coupler 20 and the front face 56 of the secondary inductive coupler 44 are in contact or substantially parallel. Alternatively or additionally, the front face 28 of the primary inductive coupler 20 and the front face 56 of the secondary inductive coupler 44 may be contoured, angled, or may be provided with correspondingly shaped features to promote substantially parallel alignment between the front face 56 of the secondary inductive coupler 44 and the at least one flat coupling face 52 of the secondary core 48.

Referring now to FIG. 2, the primary core 32 can be positioned adjacent to the front face 28 of the primary inductive coupler 20. For example, the at least one flat coupling face 34 of the primary core can be exposed directly to the front face 28 of the primary inductive coupler 20 without any intervening conductive elements. Likewise, the secondary core 48 can be positioned adjacent to the front face 56 of the secondary inductive coupler 44. Thus, the at least one flat coupling face 52 of the secondary core 48 can be exposed directly to the front face 56 of the secondary inductive coupler 44 without any intervening conductive elements. It is noted that, while certain embodiments are described with respect to planar core topology, alternative inductive charging geometries may be used such as, for example, cylindrical stab connector common to charging applications in the auto industry, Marine Inductive Optical Connector (MIOC) intended as a non-contact wet mate connector for use in cabled seafloor observatories, or the like. In some embodiments, the core topology may be configured to form a cylindrical coaxial transformer.

Referring collectively to FIGS. 1, 2, 3A, and 3B, the primary component 12 may comprise a primary power converter 58 for manipulating the frequency of the power source 22. Specifically, the primary power converter 58 may be operatively connected to the power source 22, and may be configured to receive electrical signals from the power source 22. The primary power converter 58 may transform the received electrical signal into an output electrical signal having a desired frequency. In some embodiments, a conducted EMI filter may be added to the input of the primary power converter 58 to protect the power source 22.

The primary component 12 may comprise primary resonant components 60 configured to drive the primary inductive coupler 20. In some embodiments, the primary resonant components 60 can be operatively connected to the power primary power converter 58 and the primary inductive coupler 20. Specifically, the primary resonant components 60 may be configured to receive the output electrical signal having the desired frequency from the primary power converter 58. In response to the frequency, the primary resonant components 60 can generate a driving electrical signal that is output to the primary inductive coupler 20, for manipulating the frequency of the power source 22. Accordingly, the power source 22 may be operatively connected to the primary winding 30 of the primary inductive coupler 20 to generate a current in the primary winding 30. The current in the primary winding 30 may induce a magnetic field in the primary core 32 that propagates to the secondary core 48 of the secondary inductive coupler 44. The magnetic field may then generate a current in the secondary winding 46 of the secondary inductive coupler 44.

In some embodiments, the primary resonant components 60 may use an LCC (inductor-capacitor-capacitor) resonant circuit topology. Accordingly, the primary resonant components 60 can comprise capacitors 62. Suitable capacitors 62 include, but are not limited to, film compensation capacitors, ceramic compensation capacitors or the like. The capacitors 62 may be collocated with the primary core 32 to improve charging efficiency.

Referring collectively to FIGS. 1 and 2, the secondary component 14 may comprise secondary resonant components 64 operatively connected to the secondary inductive coupler 44. The secondary resonant components 64 may be configured to improve the power transfer efficiency of the primary inductive coupler 20 and the secondary inductive coupler 44. In some embodiments, the secondary resonant components 64 can be configured to have substantially the same frequency characteristics as the primary resonant components 60. In one embodiment, the primary resonant components 60 and the secondary resonant components 64 can be tuned to resonate at substantially the same frequency. Accordingly, the secondary resonant components 64 may use the same circuit topology as the primary resonant components 60. In order to reduce the size of the secondary component 14, the secondary resonant components 64 may comprise low-profile inductors and capacitors. In one embodiment, a reduction of an additional 17 cubic inches was achieved, bringing the total volume to 135 cubic inches and a size reduction factor to 1.8.

The secondary component 14 may comprise a secondary power converter 66 operatively connected to the secondary resonant components 64. The secondary power converter 66 may be configured to condition the electrical signal output from the secondary resonant components 64 for transfer to the load 50. For example, when the load 50 comprises a DC component such as a battery, the secondary power converter 66 may comprise one or more rectifiers configured to rectify the electrical signal output from the secondary resonant components 64.

Referring again to FIG. 1, the primary component 12 may comprise a controller 68 operatively connected to the power source 22 via the primary power converter 58. The controller 68 may be configured to control the operation of the primary power converter 58. For example, the controller 68 can automatically adjust the frequency of the output electrical signal provided by the primary power converter 58. Accordingly, the transfer of power can be automatically controlled. The controller 68 may be a processor, an integrated circuit, an analog integrated circuit, a microchip, a computer, or any other computing device capable of executing machine readable instructions. The controller 68 may be operatively connected to memory such as, for example, RAM, ROM, a flash memory, a hard drive, or any device capable of storing machine readable instructions.

Thus, embodiments of the present disclosure may comprise logic or an algorithm written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as implemented via either a field-programmable gate array (FPGA) configuration or an application-specific integrated circuit (ASIC), and their equivalents.

In some embodiments, the controller 68 may be configured to provide closed loop control of the transfer of power from the power source 22 of the primary component 12 to the load 50 of the secondary component 14. Specifically, the controller 68 can be provided with charging data that is indicative of an electrical signal of the secondary component 14 via a wireless data coupler 70 that operates as a feedback channel. The wireless data coupler 70 may be configured to communicate, i.e., send and/or receive data signals via any wireless communication protocol. For example, wireless data coupler 70 may be configured to operate a local area network according to a Wi-Fi standard such as, for example, 802.11b, 802.11ac, and the like.

According to the embodiments described herein, the wireless data coupler 70 may comprise a primary antenna 72 coupled to the primary component 12 and a secondary antenna 74 coupled to the secondary component 14. Accordingly, the wireless data couple may be configured to communicate data wirelessly between via the fluid interposed between the primary component 12 and the secondary component 14. Each of the primary antenna 72 and the secondary antenna 74 can be provided according to any antenna topology such as, for example, a patch antenna array.

Referring still to FIG. 1, the primary component 12 may comprise primary communication hardware 76 operatively connected to the controller 68 and the primary antenna 72. The secondary component 14 may comprise secondary communication hardware operatively connected to an electrical sensor 80 and the secondary antenna 74. Each of the primary communication hardware 76 and the secondary communication hardware 78 may comprise components suitable for communicating data signals via an antenna such as, for example, modems, attenuators, antenna switches, amplifiers, receivers, transmitters, transceivers, or combinations thereof.

The electrical sensor 80 may be configured to detect charging data indicative of the electrical signal applied to the load 50. In some embodiments, the electrical sensor 80 may be configured to detect voltage, current, frequency, and the like. In one embodiment, the electrical sensor 80 may be operatively connected to the load 50. Alternatively or additionally, the electrical sensor 80 may detect the charging data via being operatively connected to other components such as, for example, the secondary resonant components 64, the secondary power converter 66, or both. In operation as a feedback loop, the secondary communication hardware 78 may operate as a transmitter for transmitting the charging data with the secondary antenna 74 to the primary antenna 72. The primary communication hardware 76 may operate as a receiver that receives the charging data with the primary antenna 72 and communicates the charging data to the controller 68. It is noted that, while the feedback loop may be provided via the wireless data coupler 70, in some embodiments the charging data may be provided via the primary inductive coupler 20 and the secondary inductive coupler 44. For example, in embodiments without the need for high bandwidth, a secondary signal may be combined with the power transfer signal to communicate data.

Referring collectively to FIGS. 1, 2, and 3A, the system 10 may comprise a mating detection sensor 82 configured to detect when the primary inductive coupler 20 and the secondary inductive coupler 44 are within an operating range of one another. Specifically, the mating detection sensor 82 may be configured to detect position data indicative of the relative positioning the primary inductive coupler 20 and the secondary inductive coupler 44. In some embodiments, the mating detection sensor 82 may be operatively coupled to the controller 68. Accordingly, the controller 68 may receive the position data from the mating detection sensor 82, and automatically determine that the primary inductive coupler 20 and the secondary inductive coupler 44 are relatively positioned in a manner suitable to transmit power, data, or both. The mating detection sensor 82 may comprise any device suitable to detect the position data such as, for example, an inductive proximity sensor, a magnetic, hall effect type sensor, and the like. In one embodiment, the mating detection sensor 82 may comprise an inductive proximity sensor mounted to the housing 24 of the primary inductive coupler 20. Additionally, the mating detection sensor 82 may be configured to detect position data indicative of the distance between the front face 28 of the primary inductive coupler and the front face of the secondary inductive coupler 44. Alternatively or additionally, the mating detection sensor 82 may be positioned upon the secondary component 14 such as, for example, upon the secondary inductive coupler 44.

It should now be understood that the embodiments described herein relate to the transfer of power, data or both between physically separated components. Such wireless transfer can be robust to fluids that are interposed between the components. Accordingly, the systems 10 described herein can be used to for wireless transfer of power, data or both in various applications such as, for example: wireless transfer of power, data or both between a docked vessel and a dock; wireless transfer of power, data or both between a rotating tool and a controller; wireless transfer of power, data or both between downhole devices, drilling equipment or both; a connector for wireless transfer of power, data or both for underwater between undersea communications cables, and the like. A non-limiting application of the embodiments provided herein is described below.

Referring collectively to FIGS. 1, 7A, 7B, and 7C, an underwater power and data transfer system 100 is illustrated. Underwater power and data transfer system 100 may include a docking station 102 for docking one or more unmanned underwater vehicles ("UUVs") 104. Docking station 102 may be operatively connected to a launch and recovery system ("LARS") 106. In one embodiment, the docking station 102 operatively connected to the LARS 106 may be deployed from a large diameter tube payload 108 from a manned underwater host vehicle 110, for deployment of UUVs 104 into an underwater environment from the host vehicle 110, and retracted into the host vehicle 110 through the large diameter tube payload 108 when UUV 104 operations have finished or are no longer necessary. In one embodiment, the host vehicle 110 is a ballistic missile nuclear submarine and the large diameter tube payload 108 may be a hatch used for vertical launching of ballistic missiles. In another embodiment, the large diameter tube payload 108 may be a modified fore or aft torpedo launch tube. The LARS 106 may also be separate from the host vehicle 110 and more permanently moored in an underwater location where UUV 104 deployment may be ongoing and concentrated in a particular location of an underwater environment. For example, the LARS 106 operatively connected to the docking station 102 may be bottom-moored to a seafloor near an underwater observatory.

Docking station 102 may vary in size and modularity and may be adapted to fit any number of UUVs 104. The docking station 102 may include the primary component 12 and each UUV 104 may comprise the secondary component 14 for underwater charging of an UUV 104, underwater data transfer of data collected by a UUV 104 during underwater operations, or both. The docking station 102 either alone, or operatively connected to the LARS 106 may provide secondary transfer and power systems for transferring data from docking station 102 to host vehicle 110. For example, the power source 22 may be positioned on the host vehicle 110 and transfer power to the docking station 102 for use with an underwater charging system 100. Alternatively or additionally, the docking station 102 may include the power source 22.

The docking station 102 may include additional hardware for proper recovery, docking, and alignment of UUV 104. In one embodiment, the docking station 102 may comprise hardware necessary to interface with a homing system on the UUV 104 to guide or autonomously guide the UUV 104 toward the docking station 102. In another embodiment, docking station 102 may comprise necessary hardware and controls for docking the UUV 104 within the docking station 102. In another embodiment, the docking station 102 may have positional, spacing, and alignment controls to correctly position the UUV 104 within the docking station 102 to correctly align hardware on both the docking station 102 and the UUV 104 for underwater wireless charging of UUV 104 and underwater wireless data transfer of data on UUV 104 to docking station 102. Docking, alignment, charging, and wireless data transfer may be autonomously controlled and implemented with proper sensors, control systems, and hardware. An alignment and spacing system on docking station 102 may provide for any of linear adjustment of the primary inductive coupler 20 and the secondary inductive coupler 44 along an x-axis, y-axis, or z-axis. Additionally, the UUV 104 may include an angular positioning system to correctly rotate the UUV 104 such that the secondary inductive coupler 44 properly aligns with the primary inductive coupler 20 on docking station 102. Additional mating detections sensors 82 on both docking station 102 and UUV 104 may be provided to ensure proper alignment, spacing, and docking. A flat interface between the primary inductive coupler 20 of the docking station 102 and the secondary inductive coupler 44 of the UUV 104 may ease mating by providing a flat surface which does not require additional positioning of connectors to facilitate power transfer.

Referring collectively to FIGS. 2, 4A, 4B, 5A, 5B, and 6, each of the E core topology 36, the I core topology 38, the PM core topology 40 were evaluated for suitability for use as the primary core 32 and the secondary core 48. Specifically, bench-top testing was performed in air over gaps of about 0 mm to about 3 mm with varying degrees of planar misalignment. Specifically, planar misalignment was varied from zero planar misalignment and planar misalignment using combinations of x, y and z, which were each adjusted to 0 mm, 1.5 mm and 3 mm of position misalignment. Two frequencies were tested (10 kHz and 100 kHz) to account for the influence of frequency.

A comparative ranking of the core topologies is summarized below in Table 1. The magnetic performance of each of the E core topology 36, the I core topology 38, the PM core topology 40 was evaluated according coupling coefficient, magnetizing inductance, and leakage inductance. The coupling coefficient, k, generally ranged from between about 0 and about 1. The coupling coefficient indicated the fraction of flux produced by primary winding 30 that couples to secondary winding 46. The magnetizing inductance, Lm, indicated the inductance due to main flux linking the primary winding 30 and secondary winding 46, i.e., mutual coupling. The leakage inductance, Ll, indicated the inductance due to leakage flux that does not link the primary winding 30 and the secondary winding 46. The testing revealed that charging performance can be improved using the E core topology 36 and the I core topology 38. Specifically, coupling coefficient, k, was relatively high and the leakage inductance, Ll was relatively low for realistic gaps and offsets (1 mm to 3 mm). As summarized in Table 1, the E core topology 36 may be preferred based upon overall performance.

TABLE 1

Ranking of Core Topologies

| Parameter | PM Core | E Core | I Core | Comment |
|---|---|---|---|---|
| Coupling coefficient: k | 3 | 1 | 1 | Gradual, linear change as gap varies (all cores) Highest values with E core and I core assembly |
| Leakage inductance: Ll | 3 | 1 | 1 | Gradual, linear change as gap varies (all cores) Lowest values with E core and I core assembly |
| Magnetizing inductance: Lm | 1 | 1 | 1 | Rapid, exponential change as gap varies (all cores) Performance is generally the same for all cores |
| Producibility | 1 | 7 | 3 | Qualitative assessment of assembly complexity |
| EMI | 1 | 2 | 3 | Qualitative assessment based on core shielding |
| Overall Rank | 3 | 1 | 7 | Skewed to emphasize magnetic performance |

Figure 8:
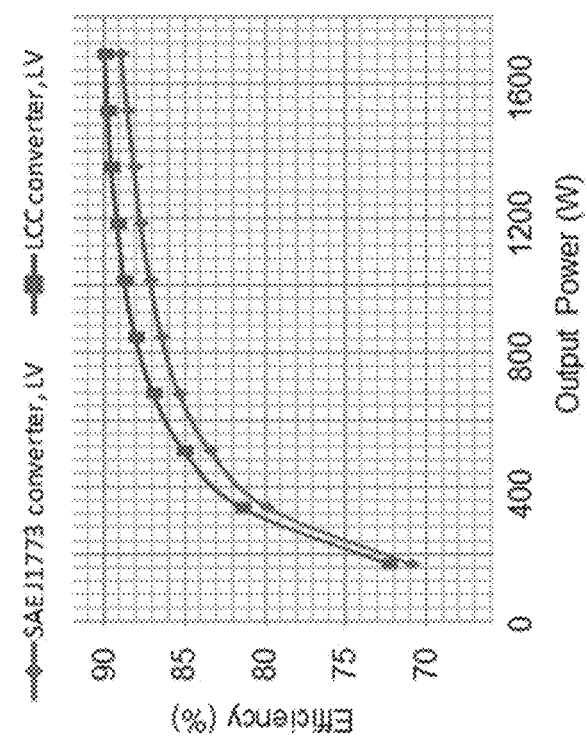
FIG. 8 graphically depicts estimated performance based on calculations and simulations conducted on resonant circuit topologies according to one or more embodiments shown and described herein.

Referring collectively to FIGS. 1 and 8, resonant circuit topologies were evaluated suitability for use as the primary resonant components 60 and the secondary resonant components 66. Specifically, a resonant circuit topology according to SAE Recommended Practice SAE J1773: Electric Vehicle Inductively Coupled Charging was compared to an LCC resonant circuit topology. The assessment revealed that the SAE J1773 topology was suited for mechanical configurations in which the inductive coupler primary is inserted into the secondary in a cylindrical stab configuration. The assessment revealed that the LCC resonant circuit topology was suitable for mechanical configurations where the inductive coupler primary and secondary meet with a flat, planar interface in addition to the cylindrical stab configuration. Computer simulation of SAE J1773 topology and the LCC resonant circuit topology indicated that the LCC resonant circuit topology is expected to produce improved system efficiency and a greater tolerance for misalignment than the SAE J1773 architecture. Indeed, the expected system efficiency in an underwater environment using the LCC resonant circuit topology approached 90%.

Figure 9:
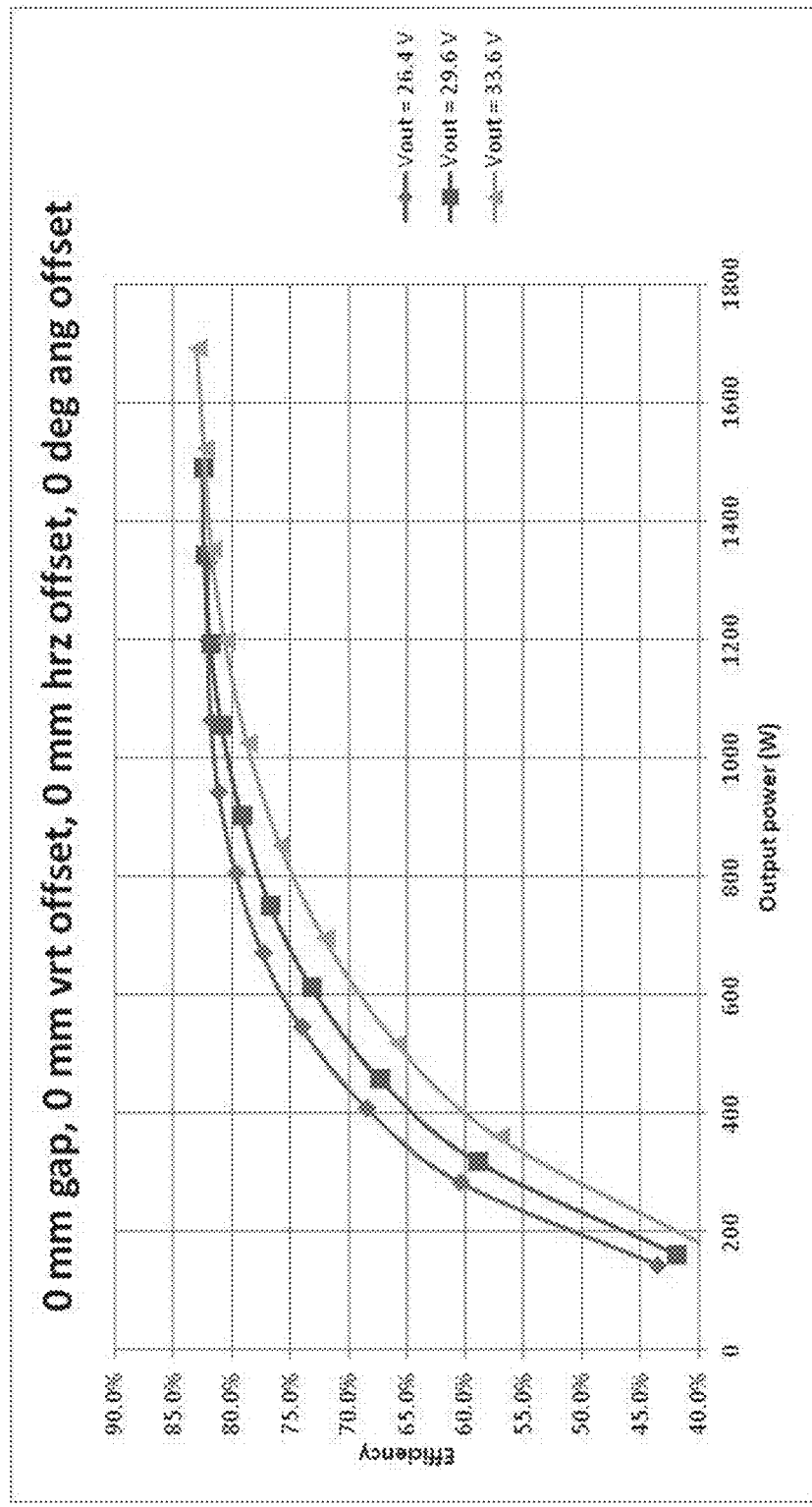
FIGS. 9 and 10 graphically depict test results for efficiency tests conducted in an underwater environment according to one or more embodiments shown and described herein.
Figure 10:
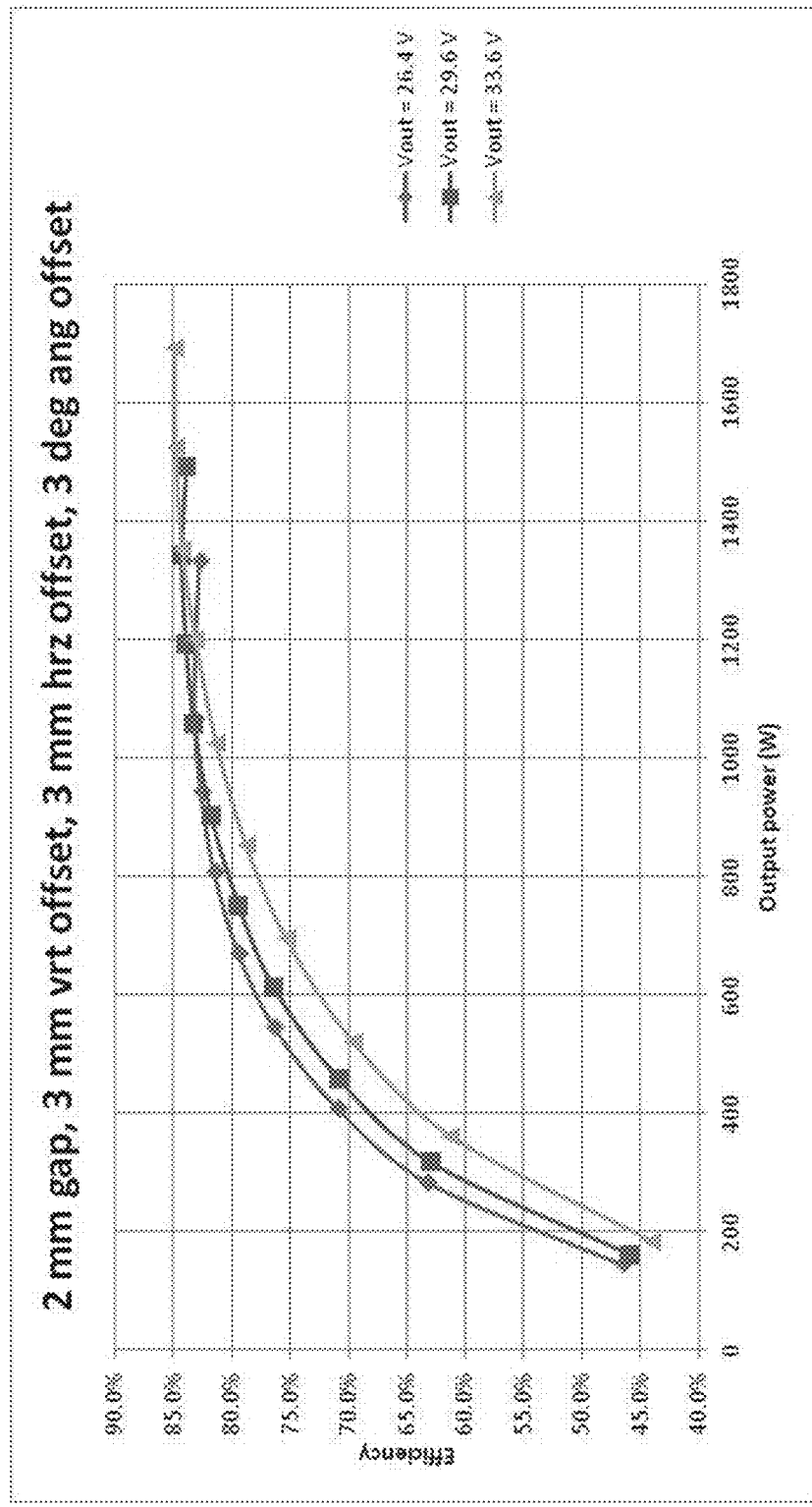
Figure 11:
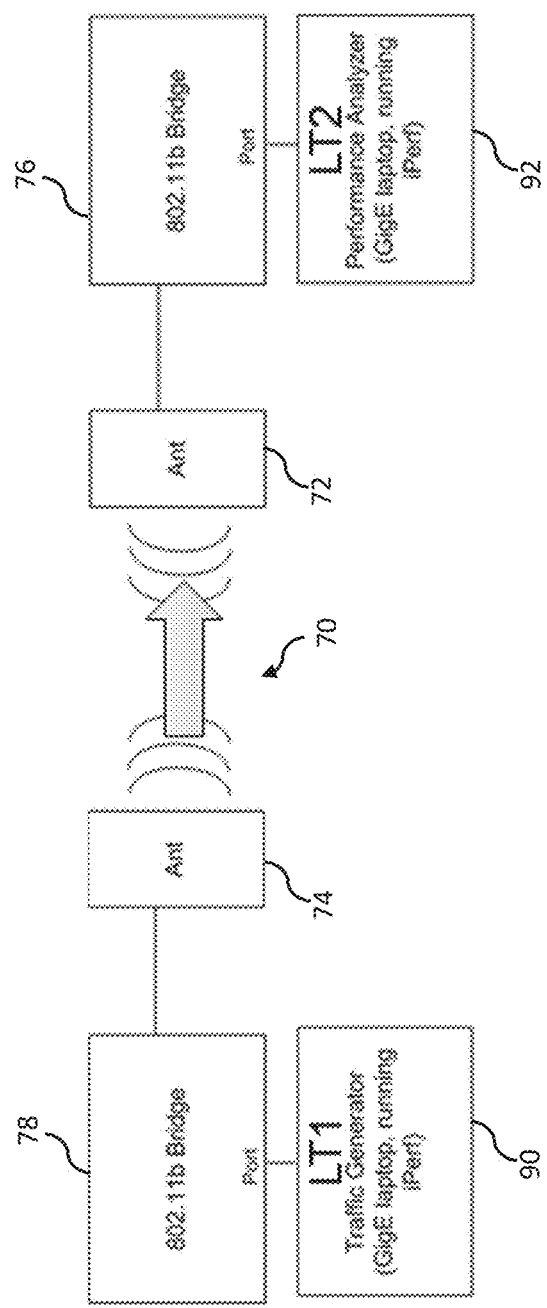
FIG. 11 schematically depicts a test setup for confirming the operation of a test system for evaluating wireless data communication compared to a reference system according to one or more embodiments shown and described herein.

Referring collectively to FIGS. 1, 2, 3A, 3B, 9, and 10, the efficiency of an exemplary system in an underwater environment was measured from input to output, i.e., efficiency from power source 22 to load 50. Accordingly, the system 10 was characterized including all electrical components, for a true total system efficiency measurement. The system 10 that was tested used: an LCC circuit topology for the primary resonant components 60 and the secondary resonant components 66; E core topology 36 for the primary core 32 and the secondary core 48; and a spiral coil on a printed circuit board for the primary winding 30 and the secondary winding 46. Curves were generated for a load 50 using the minimum, typical and maximum Bluefin UUV battery voltages of 26.4 V, 29.6 V and 33.6 V, respectively. Test results for the two alignment configurations are depicted in FIGS. 9 and 10. The best case mechanical alignment (FIG. 9) had a gap 42 spacing of about 0 mm, vertical offset along the y-axis of about 0 mm, a horizontal offset along the z-axis about 0 mm, and an angular rotation around the z-axis of about 0 degrees. The worst case mechanical alignment (FIG. 10), had a gap 42 spacing of about 2 mm, vertical offset along the y-axis of about 3 mm, a horizontal offset along the z-axis about 3 mm, and an angular rotation around the z-axis of about 3 degrees.

The efficiency performance was better at the worst case mechanical alignment (FIG. 10), as expected. At worst case mechanical alignment, circulating resonant currents are relatively low, which means power losses from resonant currents are also relatively low. At the best case mechanical alignment (FIG. 9), circulating resonant currents were relatively high, thus producing relatively high power losses. The maximum measured efficiency was 84.9% at the 1700 W output power rating for the worst case mechanical alignment. It is believed that the efficiency can be improved by reducing coil losses due to the proximity effect. Such an improvement can be achieved using alternative coil pattern designs such as, for example, multiple layers of thin foil. It is further believed that the efficiency can be improved by reducing secondary hookup wire losses. Such an improvement can be achieved using large cross section wire, or by replacing the multi-strand wires used in the demonstration unit with Litz magnet wire. Such improvements may lead to a total efficiency improvement of greater than about 5%.

Figure 12:
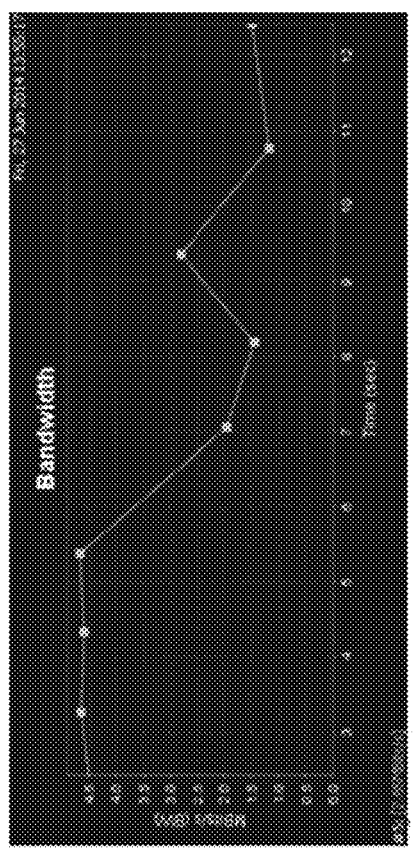
FIG. 12 graphically depicts test results generated by the test setup of FIG. 11 according to one or more embodiments shown and described herein.
Figure 12:
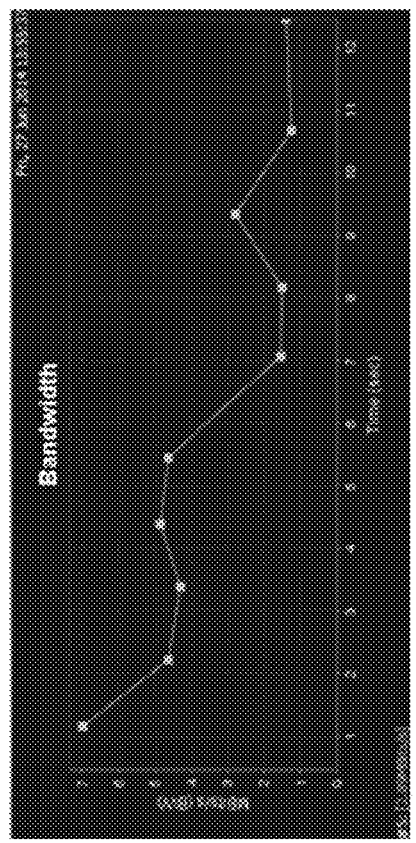

Referring collectively to FIGS. 11, 12, 13, and 14, hardware and communication protocol configurations were evaluated for suitability for use with the wireless data coupler 70. A legacy UDRS approach was evaluated with link testing in the laboratory. The legacy UDRS used a wireless patch antenna as the primary antenna 72 and the secondary antenna 74, and the primary communication hardware 76 and the secondary communication hardware 78 comprised a Wi-Fi bridge using the 802.11b standard. The wireless patch antenna was contained in a molded cable assembly and was demonstrated to support the full data rate without errors with a maximum of 178 mm (7 inches) of water gap, though in the legacy UDRS design, the clamp aligned the two patch antennas to within a 12.7 mm (0.5 inches) gap. Laptops used iPerf to measure performance over a defined antenna gap. iPerf was used as a network testing tool to create Transmission Control Protocol (TCP) and User Datagram Protocol (UDP) data streams and measure the throughput of the network. One laptop was used as a traffic generator 90 and a second laptop served as a performance analyzer 92. The data rate of the legacy UDRS observed in the field demonstrations (1.5-2 Mbps) was correlated to the iPerf test results. The results are depicted in FIG. 12.

Figure 13:
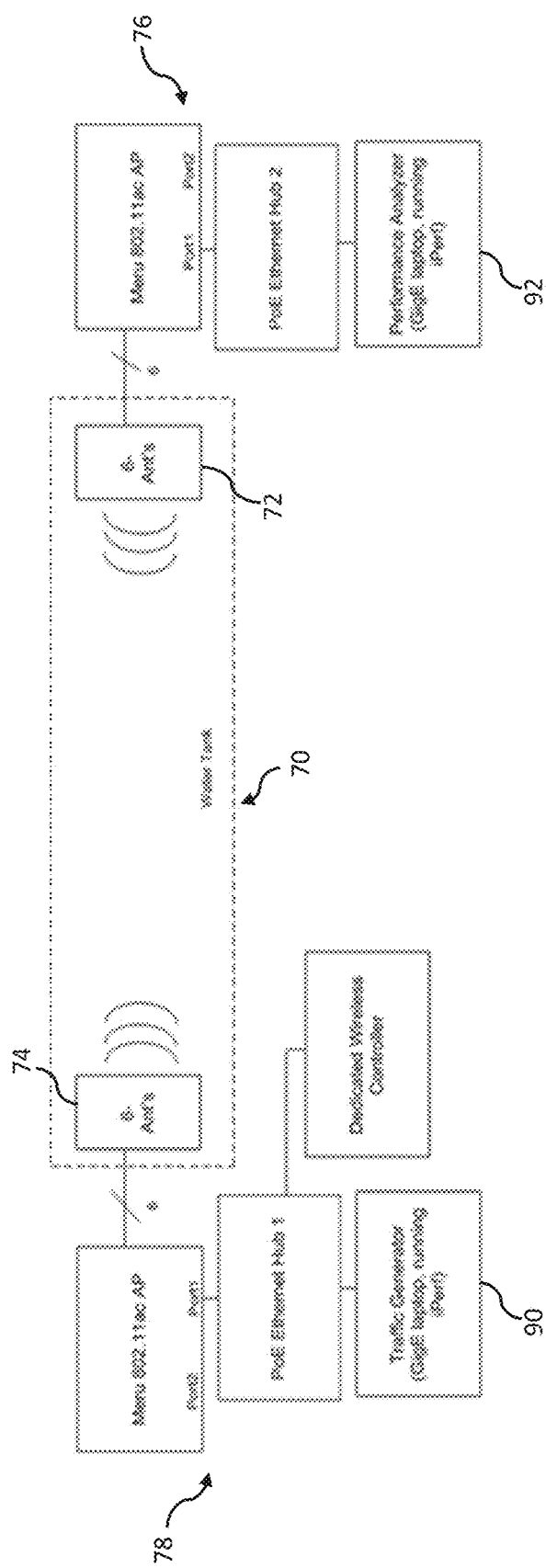
FIG. 13 schematically depicts a test setup for evaluating wireless data communication of an exemplary wireless data coupler according to one or more embodiments shown and described herein.
Figure 14:
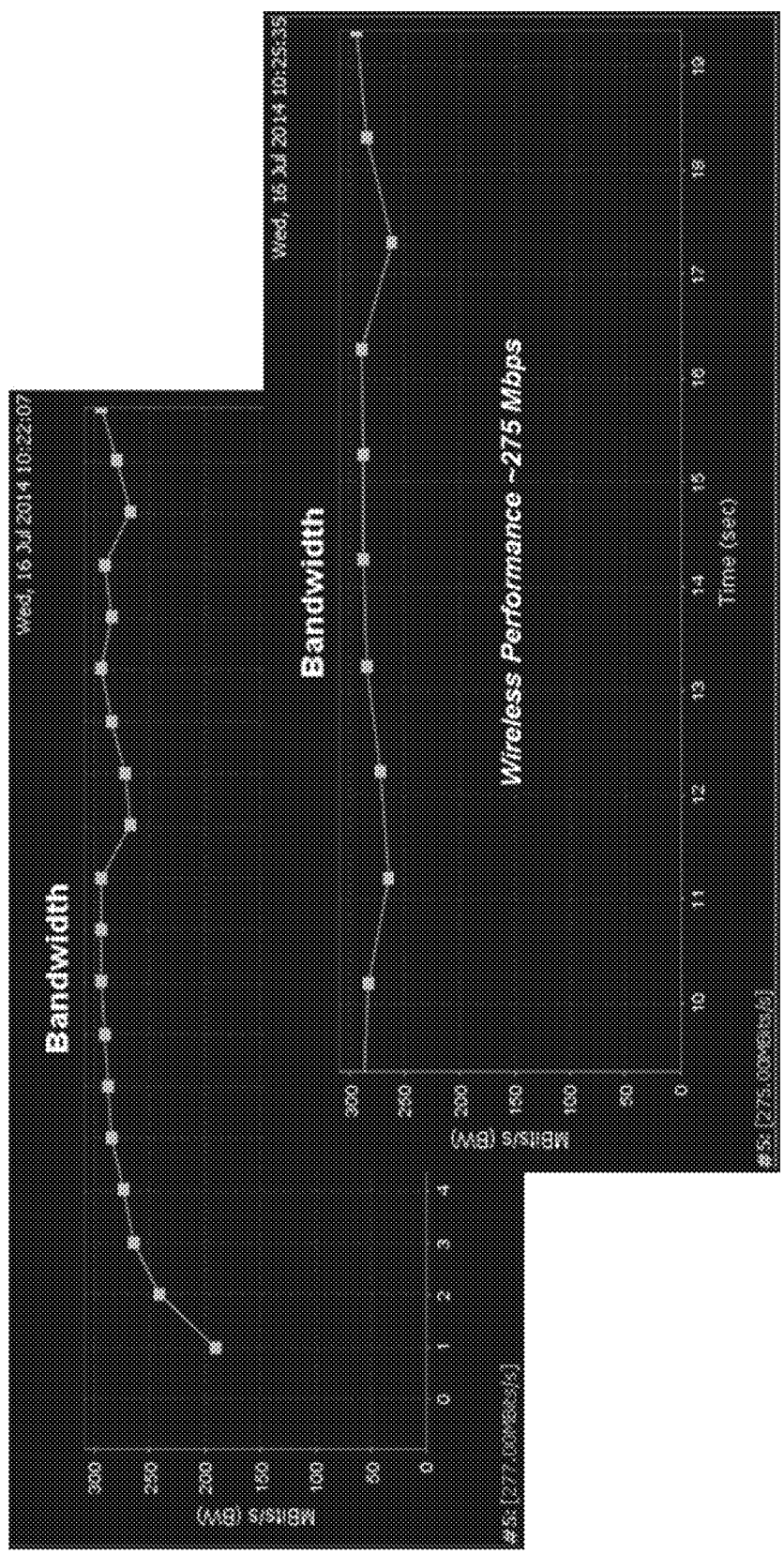
FIG. 14 graphically depicts test results generated by the test setup of FIG. 13 according to one or more embodiments shown and described herein.

Referring now to FIG. 13, wireless data transfer system improvements using the 802.11ac standard were evaluated with link testing in the laboratory. An array of six of the wireless patch antennas were used as the primary antenna 72 and the secondary antenna 74. The antennas were potted with an epoxy coating. The primary communication hardware 76 and the secondary communication hardware 78 each comprised a wireless access point, an access point controller, and a Power over Ethernet (PoE) Ethernet Hub. A traffic generator 90 comprised a laptop linked to the wireless controller of the secondary communication hardware 78 to generate traffic using the 802.11ac standard. A performance analyzer 92 comprised a laptop linked to the wireless controller of the primary communication hardware 76 to analyze the traffic according to the 802.11ac standard. The laboratory configuration was validated to preclude any possibility of a false communication path between the two access points. Repeated testing showed that the links did, in fact, drop out whenever the wireless access points were installed in "Faraday Cage" boxes minus any external antennas. Accordingly, the communications path was validated as being provided via the primary antenna 72 and the secondary antenna 74.

As depicted in FIG. 12, submerged testing of the 802.11ac wireless link achieved greater than about 250 Mbps of bandwidth with ½ inch of water gap between the primary antenna 72 and the secondary antenna 74. The results were comparable to a mock-up performance with the primary antenna 72 and the secondary antenna 74 in air during checkout, which measured about 275 Mbps. In general no degradation in link performance was noted as water gap was increased until the link dropped out. The testing indicated that link drop out occurred at about 1.75 inches of water gap between the primary antenna 72 and the secondary antenna 74.

As is noted above, the embodiments described herein have demonstrated improved performance in wireless communication of power and data between physically separated components in an underwater environment. The demonstrated improvements are summarized below in Table 2.

TABLE 2

Demonstrated Improvements over Comparative Example

| Parameter | Comparative Example | Tested Embodiment |
|---|---|---|
| Charging Power | 500 W max (22-34 V, 0-15 A) | 1700 W max (22-34 V, 0-50 A) |
| Charging Efficiency based upon overall system performance | 74% | 84.9% |
| Recharge Time of load comprising 3 × 1.5 kWh Blue-fin Lithium-Polymer batteries | about 12 hours | about 4 hours |
| Size of UUV hardware | 243 cu in | 180 cu in |
| Data Transfer Rate | 1-2 Mbps | about 250 Mbps |

Unless specifically stated to the contrary, the numerical parameters set forth in the specification, including the attached claims, are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and apparatuses have been illustrated by describing example embodiments, and while the example embodiments have been described and illustrated in considerable detail, it is not the intention of the applicants to restrict, or in any way limit, the scope of the appended claims to such detail. It is, of course, not possible to describe every conceivable combination of components or methodologies for purposes of describing the systems, methods, and apparatuses. With the benefit of this application, additional advantages and modifications will readily appear to those skilled in the art. Therefore, the present application, in its broader aspects, is not limited to the specific details and illustrative example and exemplary embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Accordingly, a quantitative representation preceded by the term "about" should be understood to include the exact quantity in addition to a functionally equivalent range surrounding the exact quantity.

As used in the specification and the claims, the singular forms "a," "an," and "the" include the plural. To the extent that the term "includes" or "including" is employed in the detailed description or the claims, it is intended to be inclusive in a manner co-extensive with the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus.

The invention claimed is:

1. A power and data transfer system, comprising:
a primary inductive coupler comprising a flat front face, a primary core and a primary winding wound around the primary core;
a secondary inductive coupler and a secondary core, the secondary inductive coupler separated from the flat front face of the primary inductive coupler by a fluid disposed there in-between, the secondary inductive coupler comprising a secondary winding wound around the secondary core, wherein the primary inductive coupler and the secondary inductive coupler are magnetically coupled;
a power source coupled to the primary winding of the primary inductive coupler and configured to generate a first voltage across the primary winding of the primary inductive coupler to generate a magnetic field in the secondary core of the secondary inductive coupler, wherein generating the magnetic field in the secondary core of the secondary inductive coupler induces a second voltage in the secondary winding of the secondary inductive coupler;
a sensor configured to monitor at least one of a voltage and a current of an electrical signal supplied to a load based on the voltage induced in the secondary winding of the secondary inductive coupler, and further configured to generate charging data characterizing the at least one of the monitored voltage and the monitored current of the electrical signal;
a controller coupled to the power source, and configured to adjust the first voltage generated in the primary winding of the primary inductive coupler based on the charging data; and
a primary antenna coupled to the controller and a secondary antenna coupled to the sensor, wherein each of the prima antenna and the secondary antenna is physically separated from and located away from both the primary inductive coupler and the secondary inductive coupler, respectively, such that the secondary antenna is configured to communicate the charging data to the primary antenna through a location which is different from magnetic coupling, that the fluid is disposed both between the primary inductive coupler and the secondary inductive coupler, and between the primary antenna and the secondary antenna.

2. The power and data transfer system of claim 1, further comprising primary resonant components coupled to the power source and the primary inductive coupler and configured to drive the primary inductive coupler.

3. The power and data transfer system of claim 2, wherein the primary resonant components comprise an inductor-capacitor-capacitor (LCC) resonant circuit topology.

4. The power and data transfer system of claim 2, wherein the primary resonant components comprise a plurality of capacitors collocated with the primary core.

5. The power and data transfer system of claim 1, wherein the primary antenna and the secondary antenna are configured to communicate according to an 802.11 protocol.

6. The power and data transfer system of claim 1, wherein at least one of the primary antenna and the secondary antenna comprise a patch antenna array.

7. The power and data transfer system of claim 1, wherein a feedback loop is provided via the primary inductive coupler and the secondary inductive coupler.

8. The power and data transfer system of claim 1, wherein the sensor corresponds to an electrical sensor and is coupled to the load.

9. The power and data transfer system of claim 1, further comprising a mating sensor coupled to the controller and configured to detect that the primary inductive coupler and the secondary inductive coupler are within an operating range.

10. The power and data transfer system of claim 1, wherein at least one of the primary winding and the secondary winding corresponds to a spiral coil.

11. The power and data transfer system of claim 1, wherein at least one of the primary winding and the secondary winding comprises a plurality of thin foil layers.

12. The power and data transfer system of claim 1,
wherein the primary core of the primary inductive coupler comprises at least one flat coupling face;
wherein the secondary core of the secondary inductive coupler comprises at least one flat coupling face; and
wherein the at least one flat coupling face of the primary core is configured to communicate the generated magnetic field in the primary core based on the voltage across the primary winding of the primary inductive coupler to the at least one flat coupling face of the secondary inductive coupler to generate the second voltage in the secondary winding of the secondary inductive coupler.

13. The power and data transfer system of claim 12, wherein at least one of the primary core and the secondary core comprise an E-core topology or I-core topology.

14. The power and data transfer system of claim 12, wherein the at least one flat coupling face of the primary core is positioned parallel to the at least one flat coupling face of the secondary core.

15. The power and data transfer system of claim 12, wherein the at least one flat coupling face of the primary core is connected directly to the front face of the primary, inductive coupler without any intervening conductive elements.

16. The power and data transfer system of claim 1, wherein the primary inductive coupler and the secondary inductive coupler are symmetric.

17. The power and data transfer system of claim", wherein the primary inductive coupler and the secondary inductive coupler is potted in epoxy, such that the primary inductive coupler and the secondary inductive coupler are waterproof and pressure tolerant.

18. An underwater power and data transfer system, comprising:
a primary inductive coupler comprising a flat front face, wherein the primary inductive coupler comprises a primary winding wound around a primary core of the primary inductive coupler;
a secondary inductive coupler separated from the flat front face of the primary inductive coupler by water disposed there in-between, the secondary inductive coupler comprising a secondary winding wound around a secondary core, wherein the primary inductive coupler and the secondary inductive coupler are magnetically coupled;

primary resonant components coupled to the primary winding of the primary inductive coupler and configured to provide a voltage to the primary winding of the primary inductive coupler to generate a magnetic field in the secondary core of the secondary inductive coupler, wherein generating the magnetic field in the secondary core of the secondary inductive coupler induces a voltage in the secondary winding of the secondary inductive coupler;

secondary resonant components coupled to the secondary winding of the secondary inductive coupler and configured to generate an electrical signal based on the voltage at the secondary winding of the secondary inductive coupler, wherein the secondary resonant components are further coupled to a load, and wherein the secondary resonant components are tuned to resonate at a substantially similar frequency as the primary resonant components, and a power converter configured to condition the electrical signal according to one or more charging parameters of the load to generate a conditioned electrical signal;

a sensor configured to monitor at least one of a voltage and a current of the conditioned electrical signal supplied to the load and to generate charging data characterizing the at least one of the monitored voltage and the monitored current of the electrical signal;

a controller configured to adjust the voltage provided by the primary resonant components to the primary winding of the primary inductive coupler based upon the charging data; and a primary antenna coupled to the controller and a secondary antenna coupled to the sensor, wherein each of the primary antenna and the secondary antenna is physically separated from and located away from both the primary inductive coupler and the secondary inductive coupler, respectively, such that the secondary antenna is configured to communicate the charging data to the primary antenna through a location which is different from magnetic coupling, that the fluid is disposed both between the primary inductive coupler and the secondary inductive coupler, and between the primary antenna and the secondary antenna.

19. The underwater power and data transfer system of claim 18, wherein the primary inductive coupler is provided on a docking station, and the secondary inductive coupler is provided on an Unmanned Underwater Vehicle.

* * * * *